US010402422B2

(12) United States Patent
Kramer

(10) Patent No.: US 10,402,422 B2
(45) Date of Patent: Sep. 3, 2019

(54) METHOD AND SYSTEM FOR SYNCHRONIZING DATA

(71) Applicant: OMS Software GmbH, Bad Kohlgrub (DE)

(72) Inventor: Christian Kramer, Munich (DE)

(73) Assignee: OMS SOFTWARE GMBH, Bad Kohlgrub (DE)

( * ) Notice: Subject to any disclaimer, the term of this patent is extended or adjusted under 35 U.S.C. 154(b) by 410 days.

(21) Appl. No.: 15/010,893

(22) Filed: Jan. 29, 2016

(65) Prior Publication Data
US 2016/0147857 A1 May 26, 2016

Related U.S. Application Data

(63) Continuation of application No. PCT/EP2014/066531, filed on Jul. 31, 2014.

(30) Foreign Application Priority Data

Aug. 1, 2013 (DE) .................. 10 2013 108 306

(51) Int. Cl.
*G06F 17/30* (2006.01)
*G06F 16/27* (2019.01)
(Continued)

(52) U.S. Cl.
CPC ............ *G06F 16/27* (2019.01); *G06F 16/211* (2019.01); *G06F 16/258* (2019.01); *G06F 16/275* (2019.01)

(58) Field of Classification Search
CPC ......... G06F 17/30575; G06F 17/30292; G06F 17/30569; G06F 17/30581; G06F 16/27; G06F 16/275; G06F 16/211; G06F 16/258
See application file for complete search history.

(56) References Cited

U.S. PATENT DOCUMENTS

| 5,392,390 A | 2/1995 | Crozier |
| 7,359,926 B1 * | 4/2008 | Yohe ................ G06F 16/27 |
| | | 707/610 |

(Continued)

FOREIGN PATENT DOCUMENTS

| WO | 2007/117132 A1 | 10/2007 |
| WO | 2007117132 A1 | 10/2007 |
| WO | 2010/036983 A1 | 4/2010 |
| WO | 2010036983 A1 | 4/2010 |

OTHER PUBLICATIONS

International Search Report, dated Dec. 2, 2014, for corresponding International Application PCT/EP2014/066531.

(Continued)

*Primary Examiner* — Huawen A Peng
(74) *Attorney, Agent, or Firm* — Myers Wolin, LLC

(57) ABSTRACT

A computer-implemented method for synchronizing a first data object to a second data object, wherein, each data object is assigned to a metaclass from a number of metaclasses, the metaclasses being organized in a tree structure with a root metaclass; a metaclass in the tree structure is ascertained that is situated on the path between the first data object and the root metaclass and on the path between the second data object and the root metaclass, a first and a second metaobject are produced from the ascertained metaclass; two transformations are performed to transform the first data object into the first metaobject and the second data object into the second metaobject; the first metaobject and the second metaobject are synchronized; and a third transformation is performed, the first metaobject being transformed into the first data object and the second metaobject being transformed into the second data object.

18 Claims, 7 Drawing Sheets

(51) Int. Cl.
*G06F 16/21* (2019.01)
*G06F 16/25* (2019.01)

(56) References Cited

U.S. PATENT DOCUMENTS

| | | | |
|---|---|---|---|
| 7,490,112 B1 | 2/2009 | Suresh | |
| 8,078,749 B2* | 12/2011 | Khosravy | G06F 16/27 |
| | | | 709/231 |
| 9,672,017 B2* | 6/2017 | Schreter | G06F 16/955 |
| 2004/0199536 A1 | 10/2004 | Barnes Leon et al. | |
| 2006/0259517 A1 | 11/2006 | Urscheler et al. | |
| 2008/0114804 A1* | 5/2008 | Foti | G06F 9/465 |
| 2012/0042299 A1* | 2/2012 | Perrin | G06F 8/10 |
| | | | 717/104 |

OTHER PUBLICATIONS

McBrien et al., "Data Integration by Bi-Directional Schema Transformation Rules", IEEE, Proceedings of the 19th International Conference on Data Engineering, pp. 227-238, IEEE Computer Society, 2003.

Visser, "Coupled Transformation of Schemas, Documents, Queries, and Constraints", Electronic Notes in Theoretical Computer Science, vol. 200(3):3-23, pp. 3-23, Elsevier B.V., 2008.

English Translation of the German Search Report issued for corresponding German Application No. 10 2013 108 306.4 dated Feb. 19, 2014.

International Search Report issued for corresponding International Patent Application No. PCT/EP2014/066531 dated Dec. 2, 2014.

* cited by examiner

METHOD AND SYSTEM FOR SYNCHRONIZING DATA

CROSS-REFERENCE TO RELATED APPLICATIONS

The present application is a continuation of International Application No. PCT/EP2014/066531 filed on Jul. 31, 2014, which claims priority to German Patent Application No. DE 10 2013 108 306.4, filed on Aug. 1, 2013, the contents of each of which are incorporated herein by reference.

FIELD OF THE INVENTION

The invention relates to a method for synchronization of a first data object with at least one second data object, as well as to a system for synchronization of a first data object with at least one second data object.

BACKGROUND

Synchronization methods for synchronization of data or data objects are known from prior art. In the field of appointment management, it is, for example, known to synchronize appointments, which are created and managed on a first client means, for example, a personal computer, with appointments, which are created and managed on a second client means, for example, a tablet PC or smart phone, wherein the appointments in both client means are created or managed with the same software system, for example, Microsoft Outlook. The appointments created and managed in the two software systems usually have the same data structure such that the synchronization of the appointments in the first client means with the appointments in the second client means may be performed without any problems. Synchronization means that the appointments of one client means are matched to the appointments of the other client means such that in both client means all appointments are on the current status.

If, however, data objects originating from different systems are to be synchronized with each other, additional measures have to be taken in order to carry out data synchronization. For example, if in a first client means appointments are managed by means of a first software system, for example, Microsoft Outlook, and in a second client means, appointments are managed by means of a second software system, for example, Google Calendar, for carrying out a synchronization, an interface or an adapter has to be provided between the two software systems, via which the synchronization may be carried out. Hereby, it has to be ensured that the adapter or the interface is adapted to carry out synchronization in both directions. Because usually the Outlook appointments have another data structure or attributes named differently than, for example, the Google appointments, it is necessary to map the attributes of the Outlook appointments to the attributes of the Google appointments and vice versa. A definition of the respective mapping rules either has to be defined or deposited in the respective software system or in the interface or adapter.

If only data or data objects of a certain class, for example, appointments, are synchronized between exactly two different software systems, the technical effort to realize a synchronization is limited, because for the execution of the synchronization, only an adapter or an interface and two correspondingly adapted mapping rules are provided.

However, this method is disadvantageous, if data or data objects between more than two software systems are to be synchronized. This method also is the detrimental, if more than two data objects are to be synchronized, which respectively are of a different type (for example, a synchronization of three appointment objects, wherein each appointment object has a different data structure). In this case, for each pair of software systems or for each pair of different data objects, an interface or adapter and two associated mapping rules have to be defined such that with respect to three different data objects, already three interfaces and six mapping rules have to be defined.

FIG. 1 illustrates the method for four different data objects $DO_1$ to $DO_4$ known from prior art. The data objects $DO_1$ to $DO_4$ may respectively represent appointments, wherein these four data objects respectively have a different data structure. In order to be able to synchronize these four data objects $DO_1$ to $DO_4$ (all four data objects should be synchronized to each other), six interfaces or adapters and twelve mapping rules in total have to be defined. If an additional data object $DO_5$ is added, which in turn has a different data structure, for this data object $DO_5$, if it is to be synchronized with the data objects $DO_1$ to $DO_4$, four additional interfaces or adapters and eight additional mapping rules have to be defined.

Accordingly, for data objects to be synchronized, with respect to the method known from prior art thus, $$\binom{n}{2} \text{ or } \frac{n \cdot (n-1)}{2}$$

adapters or interfaces, and $$\binom{n}{2} \cdot 2$$

or $n \cdot (n-1)$ mapping rules have to be implemented.

SUMMARY

Therefore, the invention is based on the technical object to provide solutions for a synchronization, which at least partially avoid the disadvantages known from prior art, and by means of which the number of necessary interfaces or adapters, as well as the number of necessary mapping rules may be substantially reduced, and by means of which nevertheless a synchronization as effective as possible is enabled.

This object is solved according to the invention by a method for synchronization of a first data object with at least one second data object, as well as by a system for synchronization of a first data object with at least one second data object according to the independent claims. Preferred embodiments and further developments of the invention are defined in the respective dependent claims.

Accordingly, a computer implemented method for synchronization of a first data object with at least one second data object is provided, wherein each data object comprises a number of attributes, wherein each data object is assigned to a metaclass from a number of metaclasses, wherein the metaclasses are organized in a tree structure with a root metaclass, and wherein the metaclasses respectively comprise a number of attributes;

a metaclass is determined in the tree structure, which is located on the path between the first data object and the root metaclass, and on the path between the second data object and the root metaclass, a first metaobject and a second metaobject are generated from the determined metaclass;

a first transformation is carried out, according to which the first data object is transformed into the first metaobject;

a second transformation is carried out, according to which the second data object is transformed into the second metaobject;

the first metaobject and the second metaobject are synchronized; and a third transformation is carried out, according to which the first metaobject is transformed into the first data object, and/or the second metaobject is transformed into the second data object.

Thereby, a number of different data objects, which respectively have a different data structure, and which even originate from different software systems or applications, may be synchronized to each other in an advantageous manner without an interface with corresponding synchronization rules having to be defined and implemented for each pair of data objects in order to map a data structure to the respectively other data structure. Interfaces or adapters between respectively two data objects of different data structure and the associated mapping rules may be omitted completely.

From a technical view, according to the invention it is avoided that for n data objects to be synchronized (each data object may be synchronized with each other data object), which respectively have a different data structure, $$\frac{n \cdot (n-1)}{2}$$

interfaces have to be implemented, and n·(n−1) mapping rules have to be provided. Thereby, a synchronization of data objects may be realized in a substantially more effective manner and with substantially lower implementation expense than it is known from prior art, in particular, if the data objects to be synchronized originate from a plurality of different systems. Error sources during the implementation of mapping rules and during the implementation of interfaces are avoided efficiently. Moreover, with respect to a change of a data structure of a data object, according to prior art it is necessary to adapt all interfaces and the mapping rules associated therewith, whereas according to the inventive method, only the relation of the corresponding metaclass to the parent class has to be adapted.

Preferably, each data object is assigned to exactly one metaclass from a number of metaclasses.

The determined metaclass is a metaclass, from which the metaclasses which the first data object or the second data object is assigned to, may be derived directly or indirectly. Accordingly, the determined metaclass is a shared parent class of those metaclasses, which the first data object or the second data object is assigned to.

The determined metaclass may be that metaclass, which is located at the lowermost position on the path between the first data object and/or between the second data object and the root metaclass in the hierarchy of the tree structure.

"At the lowermost position" means that the distance between the root metaclass and the determined metaclass is at maximum. In case several metaclasses are determined, which are located on the path between the first data object and the root metaclass, and on the path between the second data object and the root metaclass, then the determined metaclass is that metaclass, the distance of which to the root metaclass is at maximum.

It is preferred, if during the first transformation, attribute values of the attributes of the first data object are transformed into attribute values of the attributes of the first metaobject, during the second transformation, attribute values of the attributes of the second data object are transformed into attribute values of the attributes of the second metaobject, and during the third transformation attribute values of the attributes of the first metaobject are transformed into attribute values of the attributes of the first data object, and/or attribute values of the attributes of the second metaobject are transformed into attribute values of the attributes of the second data object.

The first transformation and/or the second transformation and/or the third transformation may respectively comprise a number of partial transformations, wherein the partial transformations of a transformation are executed subsequently and in a predetermined order.

A partial transformation may transform the first data object or the second data object into a temporary metaobject, or a temporary metaobject into the first data object or into the second data object, or a temporary metaobject into the first metaobject or into the second metaobject, or the first metaobject or the second metaobject into a temporary metaobject, wherein the temporary metaobject corresponds to an instance of a metaclass, which is located on the path between the first data object and/or between the second data object and the determined metaclass.

During the synchronization of the first metaobject with the second metaobject, attribute values of the attributes of the first metaobject may be mapped to attribute values of the attributes of the second metaobject, or vice versa, according to a predetermined synchronization rule.

At least one transformation rule may be assigned to each transformation and/or each partial transformation, which comprises a mapping rule indicating, how the attributes of a data object, a temporary metaobject, or a metaobject are to be mapped to the attributes of a data object, a temporary metaobject, or a metaobject.

At least one transformation rule may comprise a validity criterion indicating, whether the transformation rule for the transformation to be executed may be used, wherein with respect to several transformation rules, a predetermined transformation rule is provided as standard transformation rule.

The standard transformation rule preferably is used, if the other transformation rules are not allowed to be used due to their validity criterion.

It is preferable, if the first data object is stored in a first storage means, the second data object is stored in the first storage means, or in a second storage means, wherein the two storage means may be coupled via a communications network to a data processing means, and/or the synchronization of the first data object with the second data object is carried out by the data processing means, wherein the tree structure of the metaclasses and the transformation rules are managed and stored in the data processing means.

The data objects may respectively comprise an identifier indicating, which metaclass the respective data object is assigned to.

Prior to the second transformation or after or during the third transformation, the second data object may be generated and stored, if the second data object is not available prior to the synchronization.

Each data object may be an instance of that metaclass, which it is assigned to.

Each metaclass, except for the root metaclass, may be derived from exactly one metaclass, which is superior in the tree structure.

According to an embodiment of the invention, it may be provided for the data objects being composed data objects, wherein each composed data object comprises a number of data objects being related to each other.

It is preferred, if within the composed data object, a predetermined data object is a master data object. Thereby, it is possible to synchronize a master data object of a composed data object, wherein the further data objects of the composed data object being related to the master data object may be co-synchronized automatically.

According to a preferred embodiment of the invention, during synchronization of a master data object or of a composed data object, also the relationships of the data objects with respect to each other or of the master data object to the further data objects of the composed data object are also synchronized.

Hereby, it is preferable, if the transformation rule or transformation rules also comprises/comprise a mapping rule indicating, how the master data object and the further data objects of the composed data object being related to the master data object are to be mapped to a temporary master metaobject or to a temporary composed metaobject.

With respect to a composed data object, it may be preferable, if
 in a first step, the data objects of the composed data object are synchronized independently of each other, preferably, according to the synchronization method according to the invention, and
 in a second step, the relationships of the data objects are synchronized to each other.

It has been found to be preferable, if the one relationship between two data objects of a composed data object also is a data object. Thereby, it is possible to also synchronize the relationship between two data objects according to the synchronization method according to the invention.

Further, a system for synchronization of a first data object with at least one second data object is provided by the invention, wherein the system comprises a data processing means being adapted to execute the method according to the invention.

The data processing means may be coupled to at least one storage means via a communications network, and may be adapted to receive the first data object via the communications network from the storage means, and to provide the second data object, after it has been synchronized with the first data object, for transmission to the storage means via the communications network.

Further, a computer program product is provided by the invention, which may be loaded into the memory of a data processing means, and may be executed on the latter, and which comprises program sections being adapted to execute the method according to the invention.

BRIEF DESCRIPTION OF THE FIGURES

Further details and features of the invention as well as concrete embodiments of the invention may be derived from the subsequent description in connection with the drawing, in which.

DETAILED DESCRIPTION OF THE INVENTION

Figure 2:
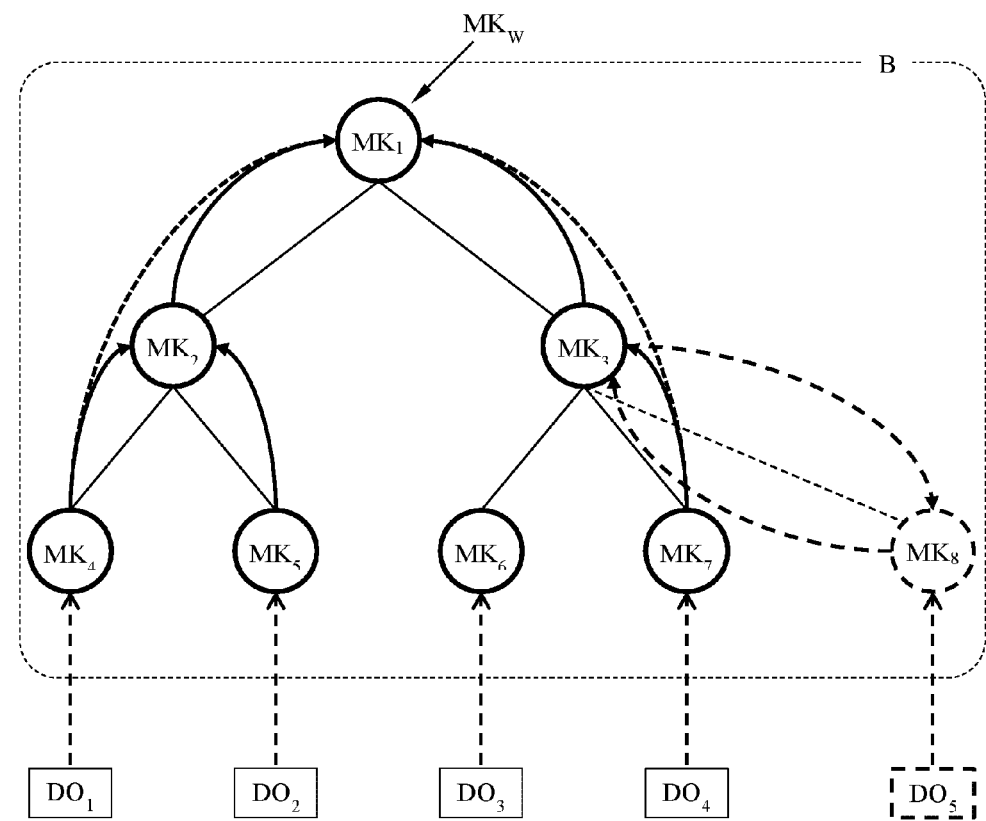
FIG. 2 shows a hierarchical tree structure for explaining the synchronization method according to the invention.

FIG. 2 shows a data structure and a number of data objects by means of which the synchronization method according to the invention will be explained.

A hierarchical tree structure B comprises a number of metaclasses $MK_1$ to $MK_7$. The hierarchical tree structure B comprises a root node, which here is indicated as root metaclass $MK_W$. The metaclasses, except for the root metaclass, respectively have exactly one parent node or a parent metaclass. Each metaclass including the root metaclass may comprise one or more child nodes or a child metaclass.

According to the present invention, the metaclasses respectively are derived from the associated parent metaclass, wherein the root metaclass $MK_W$ forms the base class. "Derived" means that a metaclass inherits the attributes of the associated parent metaclass. For example, the metaclass $MK_2$ inherits the attributes of the root metaclass $MK_1$ and the metaclass $MK_4$ inherits the attributes of the metaclass $MK_2$, wherein due to the inheritance hierarchy, the metaclass $MK_4$ also inherits the attributes of the root metaclass $MK_1$. Each metaclass, except for the root metaclass, $MK_1$ may, in addition to the inherited attributes, comprise additional attributes such that the derived metaclass generally comprises more attributes than the associated parent metaclass.

In the example according to FIG. 2, the metaclass $MK_1$ or the root metaclass $MK_W$ may be a class for a base appointment object. The base appointment object, for example, may comprise the attributes ID, starting time, finishing time, starting date and finishing date. I.e., that all metaclasses being derived from the base appointment class directly or indirectly comprise these five attributes.

The appointment class $MK_2$ derived from the base appointment class $MK_1$ may, for example, define the additional attribute "time zone" such that the appointment classes being derived from the appointment class $MK_2$ also comprise this additional attribute.

The appointment class $MK_3$ derived from the base appointment class may, for example, comprise the additional attribute "category".

In the appointment class $MK_4$ derived from the appointment class $MK_2$, the additional attribute "location" may be defined, and in the appointment class $MK_5$ derived from the appointment class $MK_2$, the additional attribute "reference" may be defined.

In the example shown in FIG. 2, a data object $DO_1$, $DO_2$, $DO_3$, or $DO_4$ is respectively assigned to the leaf nodes of the tree structure B or to the metaclasses $MK_4$, $MK_5$, $MK_6$, and $MK_7$. The assignment of the data objects $DO_1$ to $DO_4$ to the respective metaclass means that the data objects $DO_1$ to $DO_4$ respectively represent the respective metaclass.

According to the invention, however, a data object may also be assigned to a metaclass different from the leaf metaclasses. For example, a data object may be assigned to the metaclass $MK_2$, i.e., this data object would represent an instance of the metaclass $MK_2$. The method according to the invention may be carried out for data objects, which are assigned to the leaf metaclasses, as well as for data objects, which are assigned to the other metaclasses including the root metaclass.

According to the invention, two data objects to be synchronized are transformed upwards along their path between the metaclass which they are assigned to and the root metaclass, wherein this path is unique for each data object, as long as a metaclass is reached, which is shared by both data objects. For example, the first shared metaclass of the data objects $DO_1$ and $DO_2$ is the metaclass $MK_2$. The first shared metaclass of the data object $DO_1$ and $DO_4$ is the metaclass which at the same time also is the root metaclass.

In the example shown in FIG. 2, the data objects $DO_1$ and $DO_2$ to be synchronized are transformed up to the metaclass $MK_2$. The data objects $DO_1$ and $DO_4$ to be synchronized are transformed up to the metaclass $MK_1$. The transformations, here, are shown as continuous arrows.

For the synchronization of the data objects $DO_1$ and $DO_4$, there are two possibilities to perform the transformation up to the metaclass $MK_1$. According to a first variant, the data objects $DO_1$ and $DO_4$ may be transformed respectively by means of a single transformation into the metaclass $MK_1$. These transformations, here, are shown as dashed arrows. Alternatively, also a multi-stage transformation may be carried out, wherein the data objects $DO_1$ and $DO_4$ at first are transformed into the metaclasses $MK_2$ or $MK_3$, and subsequently, the metaclasses $MK_2$ and $MK_3$ are transformed into the metaclass $MK_1$.

After the data objects to be synchronized have been transformed up to the shared metaclass, they may be synchronized there, as explained in more detail with reference to FIG. 3 to FIG. 5. The transformation of the data objects to be synchronized up to the shared metaclass has the advantage that the data objects to be transformed have an identical data structure such that synchronization may be carried out in a particularly simple manner.

After the two transformed data objects have been synchronized, they may be transformed downwards again, and eventually replace the original data object. In the example shown in FIG. 2, the data objects $DO_1$ and $DO_2$ are transformed up to the metaclass $MK_2$. The transformed data objects then are synchronized, and subsequently are transformed downwards again, wherein the two synchronized data objects respectively replace or overwrite the corresponding original data object $DO_1$ or $DO_2$.

By this method, interfaces or adapters between respectively two data objects of a different data structure and the associated mapping rules or synchronization rules may be omitted. Only transformations have to be defined in the tree structure, according to which the data objects are transformed upwards, and the synchronized data objects are transformed downwards, respectively.

Figure 1:
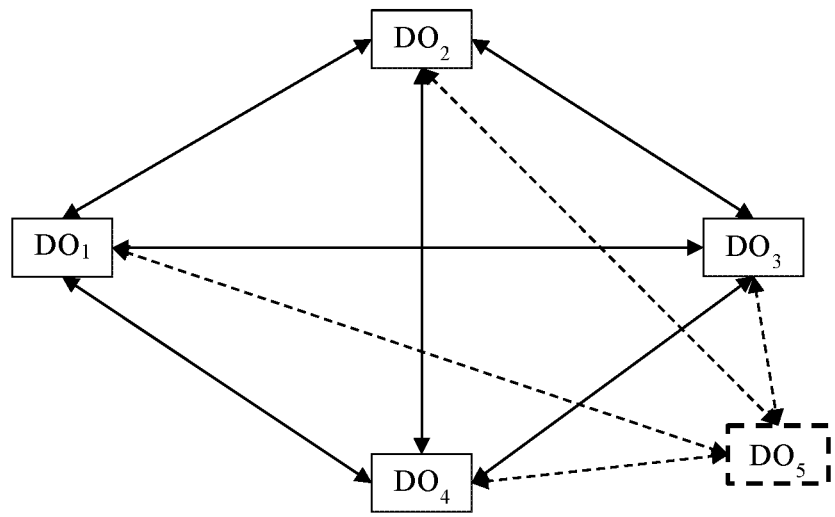
FIG. 1 shows data objects to be synchronized according to a synchronization method known from prior art.

The advantage of the method according to the invention will be apparent, if in the example shown in FIG. 2, an additional data object $DO_5$ being assigned to a metaclass $MK_8$, which in turn is derived from the metaclass $MK_3$, are to be synchronized with the data objects $DO_1$ to $DO_4$. In this case, only a transformation to the metaclass $MK_3$, and a transformation from the metaclass $MK_3$ to the data object or to the metaclass $MK_8$ has to be defined, whereas according to the method shown in FIG. 1, four additional interfaces and eight additional mapping rules would have to be defined. For the synchronization of the additional data object $DO_5$ with, for example, the data object $DO_1$, for transformation of the data object $DO_5$ up to the metaclass $MK_1$, the transformation from the metaclass $MK_3$ to the metaclass $MK_1$ may be re-used. The same is applicable for the transformation of the data object to be synchronized from the metaclass $MK_1$ to the metaclass $MK_3$.

Accordingly, the advantage of the method according to the invention specifically is that for each additional data object to be synchronized having a data structure different from data to be synchronized already available, only an additional metaclass has to be defined, from which the additional data object to be synchronized is instantiated, and which is derived from an already available metaclass in the tree structure B. For the additional data object to be synchronized, moreover, only two transformations have to be defined, namely, from the new metaclass to the associated parent metaclass, and from the associated parent metaclass to the new metaclass. Thereby, now the new data object, for example, the data object $DO_5$, may be synchronized with all other data objects $DO_1$ to $DO_4$. The low number of transformations, moreover, results in the maintenance effort being minimized, and new data objects or the associated metaclasses being able to be inserted particularly simple and quick into the already available tree structure B.

Figure 3:
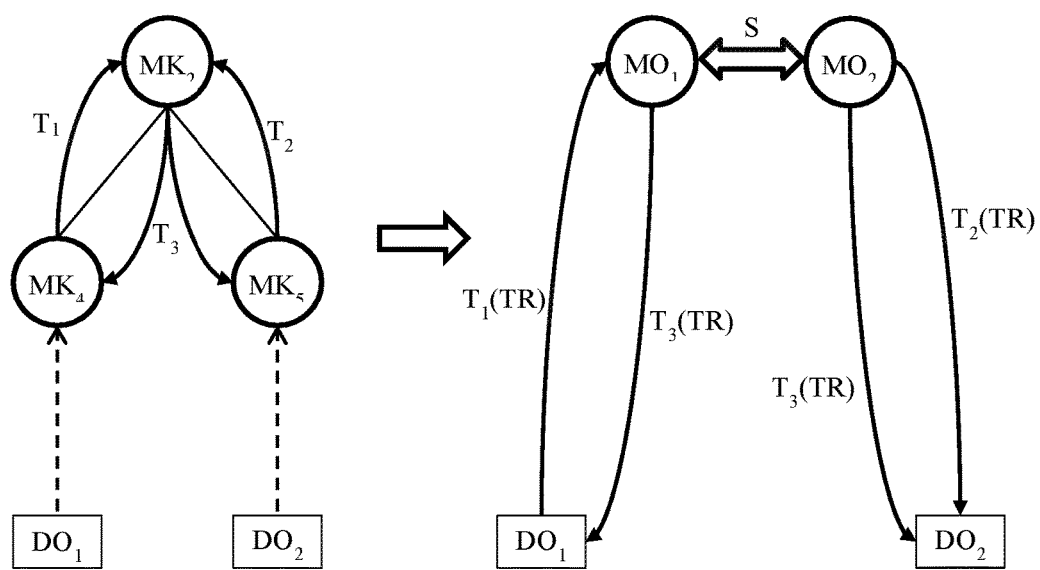
FIG. 3 shows a section from FIG. 4, by means of which an embodiment is described specifically.

FIG. 3 shows a section of the hierarchical tree structure shown in FIG. 2, by means of which the synchronization of the two data objects $DO_1$ and $DO_2$ should be illustrated.

The data object $DO_1$ is an instance of the metaclass $MK_4$. The data object $DO_2$ is an instance of the metaclass $MK_5$. The metaclass $MK_4$ and the metaclass $MK_5$ respectively are derived from the metaclass $MK_2$, i.e., the metaclass $MK_2$ is the shared parent metaclass of the two metaclasses $MK_4$ and $MK_5$. As has been explained with reference to FIG. 2, the data objects $DO_1$ and $DO_2$ are respectively transformed to the metaclass $MK_2$. For the transformation of the data object $DO_1$, the transformations $T_1$ and for the transformation of the data object $DO_2$, the transformation $T_2$ are provided.

In order to transform the two data objects $DO_1$ and $DO_2$, at first, two metaobjects $MO_1$ and $MO_2$ are generated. Hereby, the metaobjects $MO_1$ and $MO_2$ are instances of the metaclass $MK_2$. By means of the first transformation $T_1$, the data object $DO_1$ is transformed into the first metaobject $MO_1$. By means of a second transformation $T_2$, the data object $DO_2$ is transformed into the second metaobject $MO_2$. Both transformations respectively are carried out according to a transformation rule, which respectively indicates, which attributes of the respective data object are to be transformed into which attributes of the respective metaobject.

The transformed data objects $DO_1$ and $DO_2$ or the metaobjects $MO_1$ and $MO_2$ have an identical data structure, because the metaobjects $MO_1$ and $MO_2$ respectively are instances of the metaclass $MK_2$. Because the transformed data objects $DO_1$ and $DO_2$ or the metaobjects $MO_1$ and $MO_2$ have the same data structure, the metaobjects $MO_1$ and $MO_2$ may be synchronized according to a synchronization rule S, even if the original data objects $DO_1$ and $DO_2$ have different attributes. For the respectively different attributes, no exceptional procedures have to be provided, because the different attributes have been transformed according to the first transformation $T_1$ and the second transformation $T_2$ into attributes of the metaobjects $MO_1$ or $MO_2$.

After successful synchronization S of the two metaobjects $MO_1$ and $MO_2$, the latter are respectively transformed in a third transformation $T_3$ into the first data object $DO_1$ or $DO_2$. The third transformation $T_3$, in turn, is carried out according to a transformation rule indicating which attributes of a metaobject are to be transformed into which attributes of a data object. After completion of the third transformation $T_3$, the data objects $DO_1$ and $DO_2$ are synchronized.

With reference to FIG. 2 and FIG. 3, as well as in the following with reference to FIG. 4 and FIG. 5, a method is described, according to which for the first, the second, and the third transformation a transformation rule is provided respectively, according to which the transformation is carried out.

According to an embodiment of the invention, several transformation rules may be assigned to each transformation. For example, several transformation rules TR may be assigned to the first transformation $T_1$ shown in FIG. 3. Then, according to the invention, during the execution of the first transformation $T_1$, a transformation rule assigned to the transformation $T_1$ is selected according to which the transformation is carried out. Thereby, for example, a certain transformation rule may be selected depending on a certain attribute value of the first data object $DO_1$. If, for example, the attribute "location" of the first data object $DO_1$ has a certain value, a first transformation rule may be selected, whereas for a different value of the attribute "location", another transformation rule may be selected.

For this, each transformation rule may comprise a validity criterion indicating according to which requirements a certain transformation rule may be applied. For example, a transformation rule may comprise a validity criterion indicating that the corresponding transformation rule only may be applied, if a certain attribute of the data object has a certain value. In case several transformation rules are assigned to a transformation, it may be preferable, if a certain transformation rule is provided as standard transformation rule, which is only applied, if the validity criteria of the other transformation rules are not met.

Figure 4:
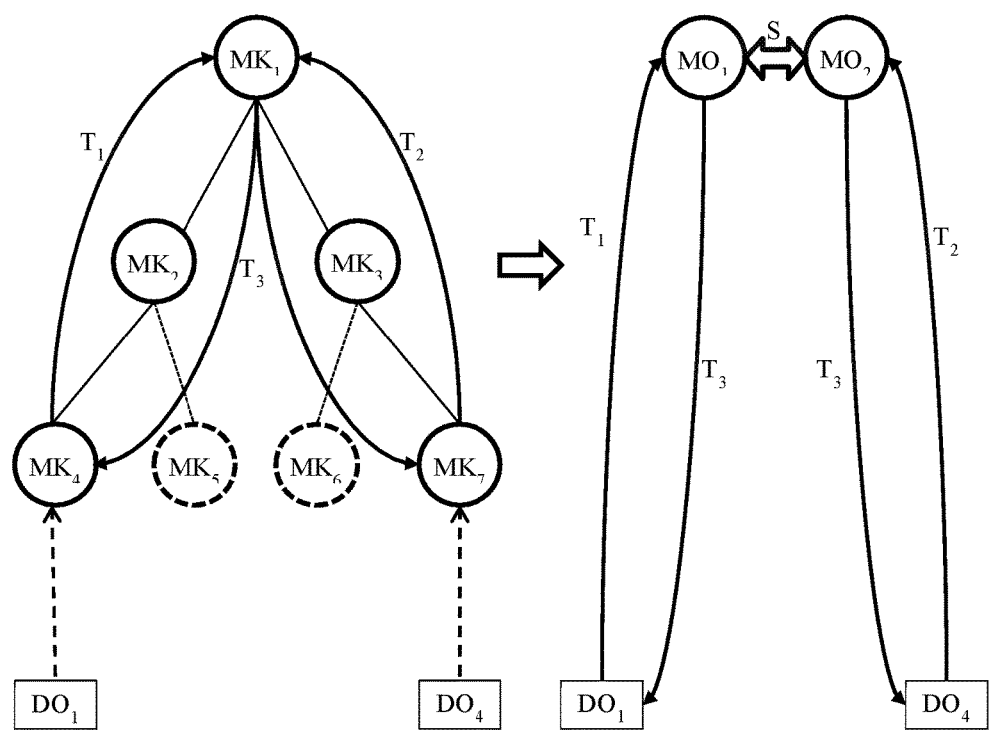
FIG. 4 shows a section of FIG. 2, by means of which an embodiment of the invention is described specifically.

FIG. 4 shows a section of the hierarchical tree structure shown in FIG. 2 for illustration of the synchronization of the data objects $DO_1$ to $DO_4$.

The data object $DO_1$ is an instance of the metaclass $MK_4$. The data object $DO_4$ is an instance of the metaclass $MK_7$. As explained with reference to FIG. 2, the metaclass $MK_1$ is the shared metaclass, from which the metaclasses $MK_4$ and $MK_7$ are derived. Accordingly, the data objects $DO_1$ and $DO_4$ are transformed according to the invention into the metaclass $MK_1$. For this, two instances $MO_1$ and $MO_2$ of the metaclass $MK_1$ are created. Then, in a first transformation $T_1$, the data object $DO_1$ is transformed into the metaobject $MO_1$. In a second transformation $T_2$, the data object $DO_4$ is transformed into the second metaobject $MO_2$. After successful transformation of the two data objects, the two metaobjects $MO_1$ and $MO_2$ are synchronized according to a synchronization rule S. After successful synchronization of the metaobjects $MO_1$ and $MO_2$, the latter and a third transformation $T_3$, are respectively transformed into the data objects $DO_1$ or $DO_4$ again such that the data objects $DO_1$ and $DO_4$ are synchronized.

Figure 5:
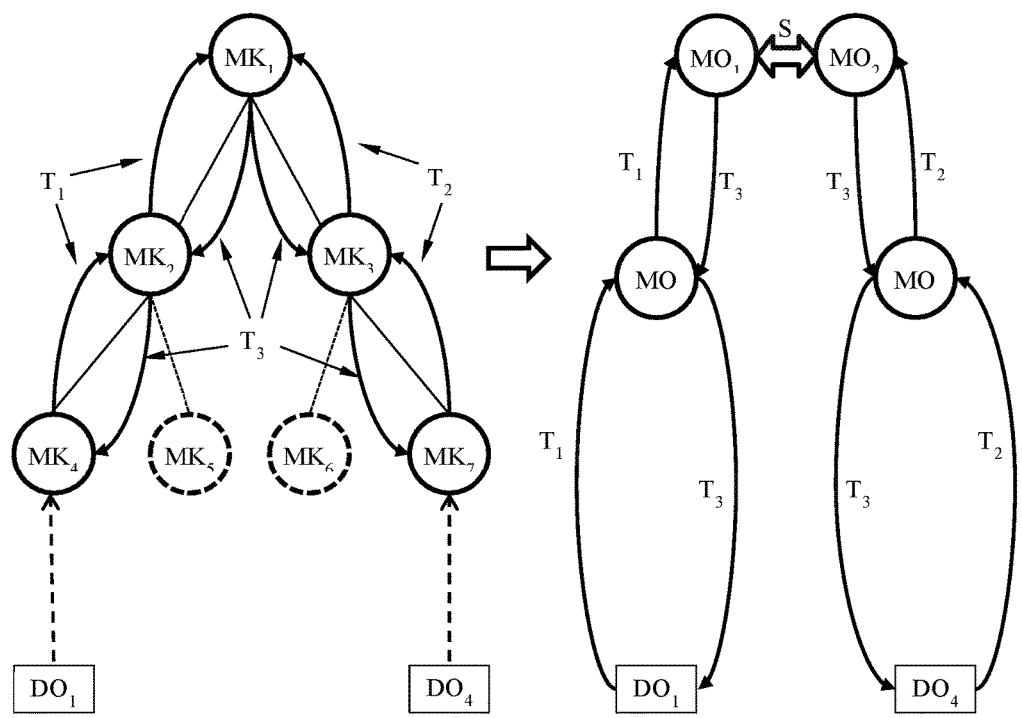
FIG. 5 shows an alternative solution to the embodiment shown in FIG. 4.

FIG. 5 shows an alternative procedure for synchronization of the data objects $DO_1$ and $DO_4$ from FIG. 4 according to the invention.

Unlike the example shown in FIG. 4, the two data objects $DO_1$ and $DO_4$ are not transformed directly by means of the transformations $T_1$ and $T_2$ into the metaclass $MK_1$, or not directly from the metaclass $MK_1$ to the data objects $DO_1$ or $DO_4$.

In the example shown here, the transformations $T_1$, $T_2$, and $T_3$ respectively comprise two partial transformations.

In a first step, a temporary metaobject $MO_T$ is generated for the metaclasses $MK_2$ and $MK_3$, which respectively lie on the path between the metaclass $MK_4$ and the metaclass $MK_1$, or between the metaclass $MK_7$ and the metaclass $MK_1$.

In a first partial transformation of the transformation $T_1$, the data object $DO_1$ is transformed into the temporary metaobject $MO_T$ associated to the metaclass $MK_2$. Subsequently, the temporary metaobject $MO_T$ is transformed in a second partial transformation of the first transformation $T_1$ into the first metaobject $MO_1$.

The second data object $DO_4$ is transformed by means of a first partial transformation of the second transformation $T_2$ into the temporary metaobject $MO_T$ associated with the metaclass $MK_3$. Subsequently, the second temporary metaobject $MO_T$ is transformed into the metaobject $MO_2$.

Hereby, the two metaobjects $MO_1$ and $MO_2$, in turn are instances of the metaclass $MK_1$. The data objects thus respectively transformed by means of two partial transformations, or the metaobjects $MO_1$ and $MO_2$ then are synchronized according to a synchronization rule S. The metaobjects $MO_1$ and $MO_2$ now synchronized subsequently are transformed respectively by means of two partial transformations into the respective temporary metaobject $MO_T$, and then into the respective data object $DO_1$ or $DO_4$ such that the data objects $DO_1$ and $DO_4$ are synchronized.

Hereby, a number of transformation rules, which respectively may comprise a validity criterion, and for which respectively a transformation rule is provided as standard transformation rule may also be respectively assigned to the partial transformations.

With reference to FIG. 2 to FIG. 5, the synchronization method according to the invention has been described for the synchronization of "simple" data objects. The synchronization method according to the invention, however, may also be used for the synchronization of composed (complex) data objects.

A composed data object consists of several or comprises several (simple) data objects being related to each other. An example for this is the composed data object "patent file" consisting of the data object "file", the data object "documents", and the data object "inventor". Hereby, the data object "file" may be the so-called master data object, and the data objects "documents" and "inventor" are related to the data object "file". The relation may, for example, be a 1:1 or a 1:n or a n:m relation.

During the synchronization of such composed data objects, the data objects belonging to the composed data object are synchronized. Further, the relationship is also synchronized, because the references of, e.g., the master data object to another data object may change, if, for example, the referenced data object receives a different unique identifier in the target system.

The synchronization of a composed data object or the data objects of a composed data object may be carried out according to the method according to the invention described above.

Figure 6:
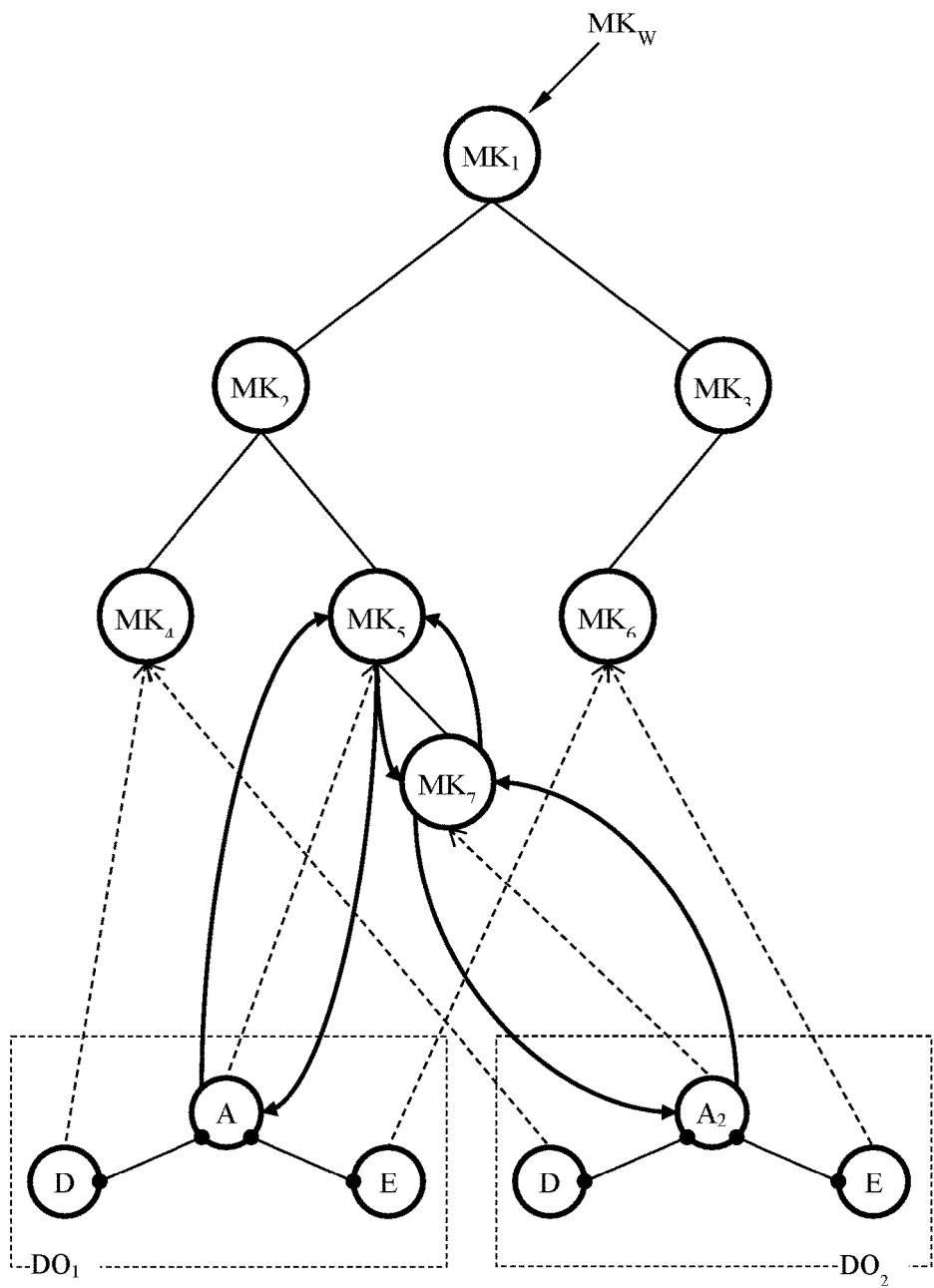
FIG. 6 shows an embodiment of the invention for synchronization of composed data objects.

FIG. 6 shows an embodiment of a synchronization method according to the invention, by means of which composed data objects may be synchronized. The first composed object $DO_1$ consists of the data objects A, E, and D, wherein the data object A is related to the data object E and to the data object D in an M:N relationship. The data object A is assigned to the metaclass $MK_5$, the data object D of the first composed data object DO to the metaclass $MK_4$, and the data object E of the first composed data object $DO_1$ to the metaclass $MK_6$.

The second composed data object $DO_2$ consists of the classes $A_2$, D, and E, wherein between the data objects $A_2$ and the data object E or D, there exists an M:N relationship respectively. The data object $A_2$ is assigned to the metaclass $MK_7$, wherein the metaclass $MK_7$ is directly derived from the metaclass $MK_5$. The data object D of the second composed data object $DO_2$ is assigned to the metaclass $MK_4$, and the data object E of the second composed data object $DO_2$ to the metaclass $MK_6$.

Although the two composed data objects $DO_1$ and $DO_2$ respectively comprise several data objects being respectively assigned to different metaclasses, according to the synchronization method according to the invention, it is possible to synchronize the two composed data objects $DO_1$ and $DO_2$ with each other.

In the example shown in FIG. 6, the metaclass $MK_5$ forms the first shared metaclass of the two data objects A and $A_2$ along the path between the data objects upwards to the root metaclass $MK_1$. As explained with reference to FIG. 3 to FIG. 5, the two data objects A and $A_2$ may be synchronized. For this, two metaobjects are instantiated from the metaclass $MK_5$, wherein the data object A of the first composed data object $DO_1$ is transformed into the first metaobject, and the data object $A_2$ of the second composed data object $DO_2$ is transformed into the second metaobject, as shown in FIG. 6 by means of the continuous arrows directed upwards. The two metaobjects of the metaclass $MK_5$ may then be synchronized as described above, and subsequently may be transformed downwards again into the corresponding data objects A and $A_2$, as shown in FIG. 6 by means of the continuous arrows directed downwards.

The data objects A and $A_2$ of the two composed data objects $DO_1$ and $DO_2$, thereby, are completely synchronized.

In a subsequent step, also the remaining data objects of the two composed data objects $DO_1$ and $DO_2$ may be synchronized. For an improved overview, in FIG. 6 corresponding transformations for the corresponding metaclasses $MK_4$ or $MK_6$ and the corresponding transformations from the metaclasses $MK_4$ to $MK_6$ into the data objects D or E are not illustrated. Nevertheless, the instances D and E of the two data objects $DO_2$ are transformed respectively into corresponding metaobjects of the two metaclasses $MK_6$ and $MK_7$. Subsequently, the metaobjects of the metaclasses $MK_4$ and $MK_6$ thus generated are synchronized, and subsequently are transformed downwards again to the respective data objects D or E, as shown, for example, with reference to FIG. 3.

Thereby, now the data objects D and E of the two composed data objects $DO_1$ and $DO_2$ are also synchronized.

In a further step, which only is being carried out optionally as needed, also the relationships between the data objects of the respective composed data objects $DO_1$ and $DO_2$ may be synchronized. This is, for example, necessary, if in the example shown in FIG. 6, the data object D of the first composed data object $DO_1$ has obtained a new primary key, on the basis of which the link to the data object A is generated. After the synchronization of the data objects of the two composed data objects $DO_1$ and $DO_2$, then, the link between the data object D and the data object $A_2$ being present in the second data object $DO_2$ would be invalid. If now also the links and relationships between the data objects of a composed data object are synchronized, the relationships and links in the synchronized data object will be valid again.

The synchronization of the relationships or links between data objects of composed data objects may result according to the invention in that also for the links, as far as hereby N:N links are concerned, corresponding metaclasses are provided in the hierarchy of metaclasses. Analogous to the examples described above, also these links may be synchronized by means of corresponding transformations. Thus, also for the synchronization of composed data objects, no interfaces or mapping rules between individual data objects to be synchronized have to be provided or implemented.

Figure 7:
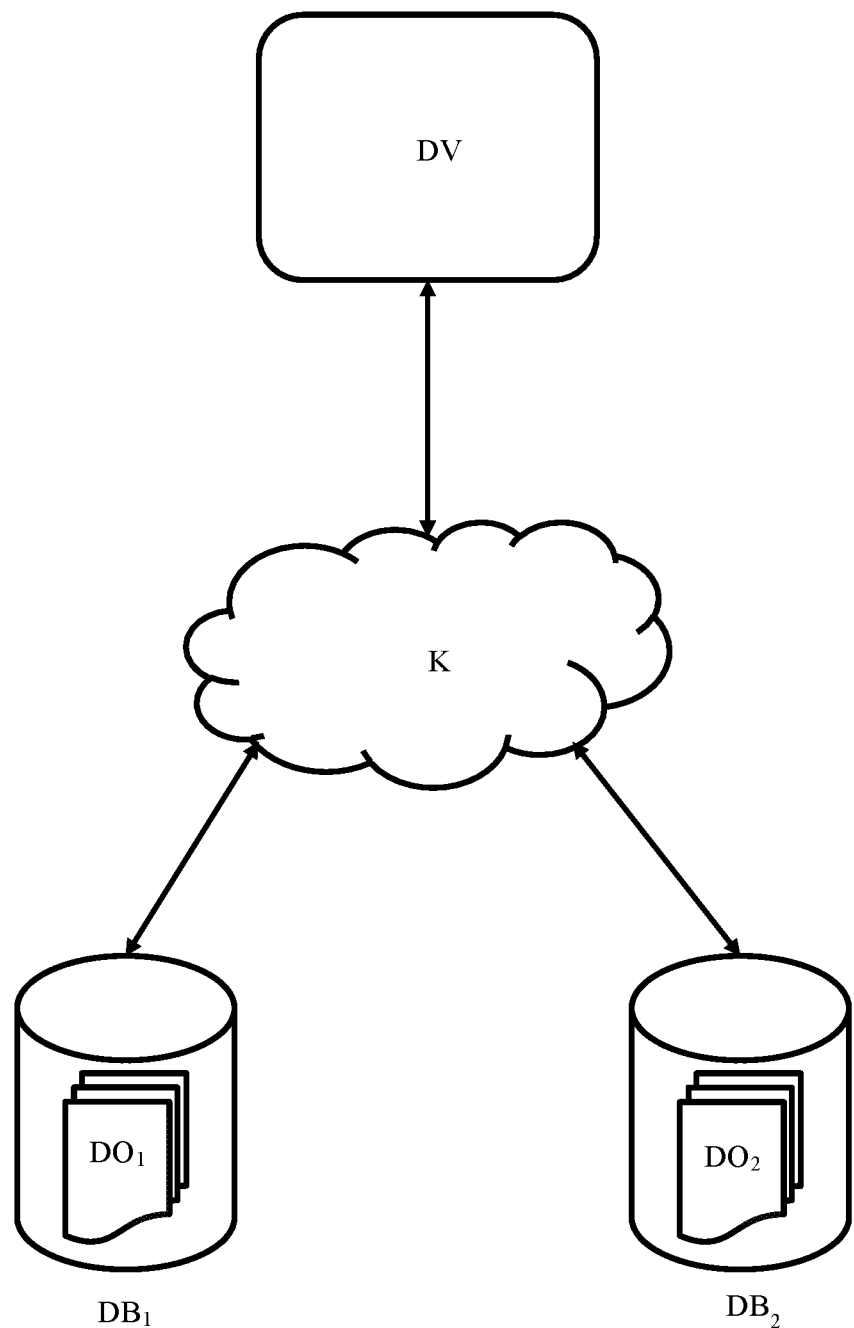
FIG. 7 shows an embodiment of the system for synchronization of data according to the invention according to the synchronization method according to the invention.

FIG. 7 shows an example of a system for synchronization of data objects according to the invention. The system comprises a data processing means DV, which is coupled to a number of storage means, for example, of a computer or of a smartphone, via a communications network K, for example, the internet. In the storage means $DB_1$ and $DB_2$, a number of data objects may be stored respectively, wherein the data objects may be instances of different metaclasses respectively.

The hierarchical tree structure described above is stored in the data processing means DV, and is administered there, if needed. The data objects stored in the storage means $DB_1$ and $DB_2$ respectively comprise an identifier indicating, which metaclass of the hierarchical tree structure stored in the data processing means DV the data object is assigned to. For synchronization of the data objects stored in the first storage means $DB_1$ with the data objects stored in the second storage means $DB_2$, these are transformed into metaobjects according to the method described above, the metaobjects are synchronized, and the synchronized metaobjects are transformed back into the respective data objects. Hereby, the data objects to be transformed may be transmitted to the data processing means DV at which the synchronization is being performed via the communications network K, and the synchronized data objects may then, in turn, be stored in the corresponding storage means via the communications network.

If new data objects representing instances of a metaclass are added to a storage means, which are not yet part of the hierarchical tree structure, only two transformations have to be defined for this additional metaclass, in order to be able to synchronize the instances of this new metaclass with all other data objects. Hereby, it is advantageous that for definition of the two transformations, only knowledge concerning the data structure of the superior metaclass is necessary (for example, with respect to the example shown in FIG. 2, for the transformation of the newly added metaclass $MK_8$, only knowledge concerning the data structure of the metaclass $MK_3$ is necessary in order to define the two transformations between $MK_8$ and $MK_3$). The configuration and the data structure of the other metaclasses in the hierarchical tree structure do not have to be known for this.

With respect to the data processing means DV, for example, a server means arranged within a Cloud may be concerned.

For the execution of the method according to the invention, a processor or a micro-processor may be provided being adapted to determine a metaclass in a tree structure, which is the shared metaclass of the data objects to be synchronized. Further, the processor or micro-processor is adapted to generate, from the determined metaclass, two metaobjects, and to perform corresponding transformations of the data objects into the metaobjects or from the metaobjects into the data objects, as described above. The definition of the tree structure of the metaclasses may, for example, be stored in an external file, for example, in a file system or in a data base, wherein the micro-processor has access to this definition of the tree structure, and accesses it during synchronization. The data objects to be synchronized may be stored in different systems, for example, in different computers. Hereby, the micro-processor is configured such that it may establish a communications connection, for example, via the internet, in order to load the data objects stored there into a main memory, and to transform the loaded data objects into the corresponding metaobjects subsequently. Then, the synchronized metaobjects are in turn transmitted to the corresponding computer systems and are stored there.

REFERENCE NUMERALS

A, $A_2$ data object
B tree structure (hierarchical)
D data object
$DB_1$, $DB_2$ storage means
$DO_1$ to $DO_n$ data objects or composed data objects
DV data processing means, e.g., a server means within the cloud
E data object
K communications network
$MK_1$ to $MK_n$ metaclasses within the tree structure B (instance of a metaclass)
$MK_W$ root metaclass within the tree structure B
$MO_1$, $MO_2$ first and second metaobject (instances of a metaclass)
$MO_T$ temporary metaobject (instance of a metaclass)
S synchronization
TR transformation rules
$T_1$ to $T_n$ transformations between data objects and metaobjects or between metaobjects and dataobjects

The invention claimed is:

1. A computer implemented method for synchronization of a first data object with at least one second data object, wherein each data object comprises a number of attributes, wherein the method is being executed on a processor, wherein
the first data object is stored in a first storage means,
the second data object is stored in a second storage means,
each data object is assigned to a metaclass amongst a number of metaclasses, wherein the metaclasses are organized within a tree structure with a root metaclass, and wherein the metaclasses respectively comprise a number of attributes;
a metaclass is determined within the tree structure, which is located on the path between the first data object and the root metaclass, and on the path between the second data object and the root metaclass, wherein the determined metaclass is that metaclass which is located at the lowermost position on the path between the first data object or between the second data object and the root metaclass within the hierarchy of the tree structure;
a first metaobject and a second metaobject are generated from the determined metaclass;
a first transformation is carried out, during which the first data object is transformed into the first metaobject, and during which attribute values of the attributes of the first data object are transformed into attribute values of the first metaobject;
a second transformation is carried out, during which the second data object is transformed into the second metaobject, and during which attribute values of the attributes of the second data object are transformed into the attributes of the second metaobject;
the first metaobject and the second metaobject are synchronized, wherein attribute values of the attributes of the first metaobject are mapped to attribute values of the second metaobject, or vice versa, according to predetermined synchronization rules; and
a third transformation is carried out, wherein the first metaobject is transformed into the first data object and attribute values of the first metaobject are transformed into attribute values of the attributes of the first data object, or the second metaobject is transformed into the second data object and attribute values of the second metaobject are transformed into attribute values of the second data object,
wherein at least one transformation rule is assigned to each transformation or each partial transformation, comprising a mapping rule indicating how the attributes of a data object, a temporary metaobject or a metaobject are to be mapped to the attributes of a data object, a temporary metaobject, or a metaobject,
wherein prior to the second transformation or after or during the third transformation, the second data object is generated and stored, if the second data object is not present prior to synchronization.

2. The method according to claim 1, wherein the first transformation or the second transformation or the third transformation respectively comprise a number of partial transformations, wherein the partial transformations of a transformation are carried out subsequently and in a predetermined order.

3. The method according to claim 2, wherein a partial transformation transforms
the first data object or the second data object into a temporary metaobject, or
a temporary metaobject into the first data object or into the second data object, or
a temporary metaobject into the first metaobject or into the second metaobject, or
the first metaobject or the second metaobject into a temporary metaobject,
wherein the temporary metaobject of an instance corresponds to a metaclass, which is located on the path between the first data object or between the second data object and the determined metaclass.

4. The method according to claim 1, wherein at least one transformation rule comprises a validity criterion indicating, whether the transformation rule for a transformation to be carried out may be used, wherein with respect to several transformation rules, a predetermined transformation rule is provided as standard transformation rule.

5. The method according to claim 1, wherein the two storage means may be coupled to a data processing means via a communications network, and
the synchronization of the first data object with the second data object is carried out by the data processing means, wherein the tree structure of the metaclasses and the transformation rules are managed and stored in the data processing means.

6. The method according to claim 1, wherein the data objects respectively comprise an identifier indicating which metaclass the respective data object is assigned to.

7. The method according to claim 1, wherein each data object is an instance of that metaclass, which it is assigned to.

8. The method according to claim 1, wherein each metaclass, except for the root metaclass is derived from exactly one parental metaclass within the tree structure.

9. The method according to claim 1, wherein the data objects are composed of data objects, wherein each composed data object comprises a number of data objects being related to each other.

10. The method according to claim 1, wherein a predetermined data object is a master data object in the composed data object, wherein the master data object of the composed data objects to be synchronized are synchronized, wherein the further data objects of the composed data object being related to the master data objects are co-synchronized automatically.

11. The method according to claim 9, wherein during synchronization of the composed data objects, the relationships of the data objects of the composed data objects to each other are also synchronized.

12. The method according to claim 10, wherein the transformation rule or transformation rules also comprises or comprise a mapping rule indicating how the master data object and the further data objects of the composed data object related to the master data object are to be mapped in a temporary master metaobject or in a temporary composed metaobject.

13. The method according to claim 9, wherein in a first step, the data objects of the composed data object are synchronized independently of each other, and in a second step, the relationships of the data objects with respect to each other are synchronized.

14. The method according to claim 9, wherein the relationship between two data objects of a composed data object also is a data object.

15. The method according to claim 1, wherein each data object is assigned to exactly one metaclass.

16. A system for synchronization of a first data object with at least one second data object, wherein the system comprises a data processing means being adapted to execute a method according to claim 1.

17. The system according to claim 16, wherein the data processing means may be coupled to at least one storage means via a communications network, and being adapted to receive from the storage means the first data object and the second data object after it has been synchronized with the first data object via the communications network, and to provide it for transmission to the storage means via the communications network.

18. A computer program product which can be loaded into the storage of a data processing means and which may be executed on the latter, and which comprises program sections being adapted to execute a method according to claim 1.

* * * * *